US008480345B2

(12) United States Patent
Hsu et al.

(10) Patent No.: US 8,480,345 B2
(45) Date of Patent: Jul. 9, 2013

(54) COMPOSITE CONTINUOUS FEEDER

(76) Inventors: Chung-Long Hsu, Miaoli County (TW); Shu-Hui Hsu, Hsinchu County (TW)

( * ) Notice: Subject to any disclaimer, the term of this patent is extended or adjusted under 35 U.S.C. 154(b) by 68 days.

(21) Appl. No.: 13/209,251

(22) Filed: Aug. 12, 2011

(65) Prior Publication Data

US 2013/0039724 A1 Feb. 14, 2013

(51) Int. Cl.
*B65G 25/00* (2006.01)

(52) U.S. Cl.
USPC ............................ 414/199; 414/301; 414/195

(58) Field of Classification Search
USPC .......................................... 414/199, 301, 195
See application file for complete search history.

(56) References Cited

U.S. PATENT DOCUMENTS 3,349,930 A * 10/1967 Welborn ....................... 414/298
4,042,130 A * 8/1977 Legille et al. ................. 414/199

FOREIGN PATENT DOCUMENTS

| | | |
|---|---|---|
| TW | M343913 | 11/2008 |
| TW | M344347 | 11/2008 |

* cited by examiner

*Primary Examiner* — Saul Rodriguez
*Assistant Examiner* — Willie Berry, Jr.
(74) *Attorney, Agent, or Firm* — Muncy, Geissler, Olds & Lowe, PLLC

(57) ABSTRACT

A composite continuous feeder is arranged above a growth furnace and comprises a primary feeder and a secondary feeder. The primary feeder includes a feeding chamber, a first material holder holding a plurality of material bits and an elevator mechanism. The elevator mechanism is coupled to the feeding chamber and first material holder, and used to lift or lower the first material holder in the feeding chamber. The secondary feeder includes a second material holder also holding a plurality of material bits, a buffering discharger and a material discharging guide tube. The buffering discharger is arranged at the outlet of the second material holder to receive the material bits output therefrom. The material discharging guide tube discharges the material bits into the growth furnace. By using the primary and secondary feeders, the invention can apply to mono-crystal and poly-crystal growth furnaces and effectively control material feeding amount and speed.

10 Claims, 4 Drawing Sheets

COMPOSITE CONTINUOUS FEEDER

FIELD OF THE INVENTION

The present invention relates to a growth furnace feeder, particularly to a composite continuous feeder for crystal growth.

BACKGROUND OF THE INVENTION

Demand for semiconductor electronic elements is persistently growing with prosperous development of IC. The main material of semiconductor—silicon—must be refined at high temperature to attain the purity demanded by semiconductor. Silicon can be categorized into monocrystalline silicon and polycrystalline silicon. Monocrystalline silicon demands high quality but is fabricated at low speed. However, monocrystalline silicon has consistent lattice arrangement and is free of defects. Polycrystalline silicon uses a lower-level fabrication process and can be fabricated fast, thus it has an advantage of lower cost. Nevertheless, polycrystalline silicon has inconsistent lattice arrangement and has boundary defects.

Monocrystalline silicon and polycrystalline silicon respectively adopt different crystal growth furnaces. A R.O.C. patent No. M344347 discloses a mono-crystal growth furnace feeder, which is mainly applied to monocrystalline growth and used to stably control the feeding speed and weight thereof. However, the fabrication speed thereof is slower. A R.O.C. patent No. M343913 discloses a poly-crystal growth furnace continuous feeder including a continuous feeder structure and a feeding method thereof. In the polycrystalline growth system, material is fed in a single process. A feeding tank feeds the material to a crucible where the material is melted to fabricate polycrystalline silicon. The prior art has an advantage that the feeding tank can feed a great amount of material in a single process, and the feeding tank can be then pulled back to undertake another feeding process once again. However, the time for the second feeding process is wasted. In the event that only a small amount of material has to be fed, the time and space of the feeding process in the prior art are particularly and obviously wasted. The conventional feeding devices always have drawbacks no matter which feeding method it adopts. Therefore, the manufacturers desire to improve the technology urgently.

SUMMARY OF THE INVENTION

The primary objective of the present invention is to solve the problem that the fabrication of monocrystalline silicon and polycrystalline silicon must adopt their respective feeder.

Another objective of the present invention is to solve the problem that the conventional poly-crystal growth furnace continuous feeder causes waste of time and space because of the second feeding process.

To achieve the above-mentioned objectives, the present invention proposes a composite continuous feeder, which is arranged above a growth furnace and comprises a primary feeder and a secondary feeder both coupled to the growth furnace.

The primary feeder includes a feeding chamber, a first material holder and an elevator mechanism. The feeding chamber communicates with the growth furnace. The first material holder holds a plurality of material bits. The elevator mechanism is coupled to the feeding chamber and the first material holder and used to lift or lower the first material holder in the feeding chamber. The secondary feeder includes a second material holder, a buffering discharger and a material discharging guide tube. The second material holder also holds a plurality of material bits. The buffering discharger is arranged at the outlet of the second material holder to receive the material bits output by the second material holder. The material discharging guide tube is corresponding to a buffering discharge outlet of the buffering discharger and communicates with the feeding chamber.

The present invention uses the primary feeder and the secondary feeder to fast feed material lest the overall feeding time is increased by waiting for recharging the material. The present invention uses the primary feeder to undertake a single material feeding process and uses the secondary feeder to undertake supplementary material feeding processes to adjust and control the feeding amount of the material bits. Further, the primary feeder and the secondary feeder may undertake material feeding processes separately to satisfy requirements of fabricating monocrystalline silicon and polycrystalline silicon.

DETAILED DESCRIPTION OF THE PREFERRED EMBODIMENTS

The technical contents of the present invention are described in detail in cooperation with drawings below.

Figure 1:
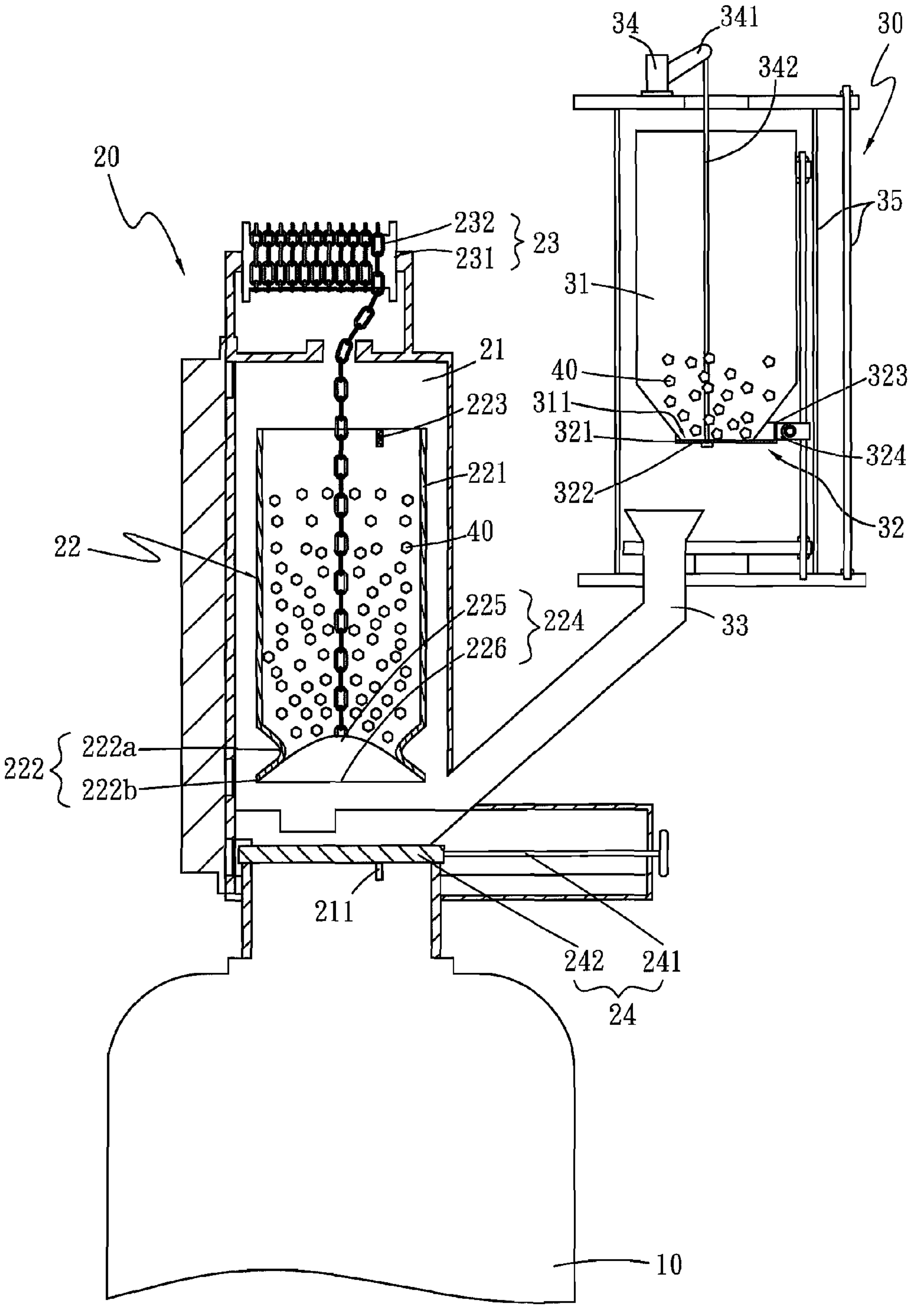
FIG. 1 is a diagram schematically showing the structure of a composite continuous feeder according to one embodiment of the present invention.

Refer to FIG. 1 for a diagram schematically showing the structure of a composite continuous feeder according to one embodiment of the present invention. The composite continuous feeder of the present invention is arranged above a growth furnace 10 and comprises a primary feeder 20 and a secondary feeder 30 both coupled to the growth furnace 10.

The primary feeder 20 includes a feeding chamber 21, a first material holder 22 and an elevator mechanism 23. The feeding chamber 21 communicates with the growth furnace 10. The first material holder 22 holds a plurality of material bits 40. The elevator mechanism 23 is coupled to the feeding chamber 21 and the first material holder 22 and used to lift or lower the first material holder 22 in the feeding chamber 21. The elevator mechanism 23 is a flexible cable-type elevator mechanism and has a reel 231 and a flexible cable 232 wound on the reel 231. The reel 231 is fixedly coupled to the feeding chamber 21, and the flexible cable 232 is coupled to the first material holder 22 to lift or lower the first material holder 22 by the reel 231. The feeding chamber 21 has a positioning block 211. The first material holder 22 has a hollow casing 221 to hold the material bits 40, an output opening 222 for discharging the material bits 40, a positioning slot 223 corresponding to the positioning block 211 for latching, and a material stopper 224 corresponding to the output opening 222. The positioning slot 223 is arranged on the outer surface of the casing 221 and coupled thereto. The positioning slot 223 latches the positioning block 211 to restrict the movement of the first material holder 22. The material stopper 224 functions as the switch of the output opening 222 to control the output of the material bits 40. The material stopper 224 is arranged inside the first material holder 22 and has a connection end 225 and a stopping end 226. The flexible cable 232 passes through the first material holder 22 to connect with the connection end 225. The shape of the stopping end 226 matches that of the output opening 222 to plug the output opening 222 for closing. In this embodiment, the material stopper 224 is formed in an arc shape. The output opening 222 has a neck portion 222*a* and an opening end 222*b* corresponding to the material stopper 224. The material stopper 224 is tightly in contact with the output opening 222. When the material stopper 224 is separated from the output opening 222, the material bits 40 slide along the inclined surface of the material stopper 224 that is formed in the arc shape to the growth furnace 10, whereby the material bits 40 is less likely to adhere to the material stopper 224.

An isolation valve 24 is arranged at the junction of the feeding chamber 21 and the growth furnace 10. The positioning block 211 is arranged near the isolation valve 24. The isolation valve 24 has a translational track 241 and a valve 242 corresponding to the translational track 241. The moving direction of the translational track 241 is perpendicular to that of the first material holder 22. Such a design is exempted from using a pivotal valve structure, whose operation demands greater space that increases the total height of the system. Compared with the conventional hydraulic elevator mechanism that uses rigid piping and needs greater height to accommodate the feeding chamber, the flexible cable-type elevator mechanism 23 can decrease the total height of the system.

The secondary feeder 30 includes a second material holder 31, a buffering discharger 32, a material discharging guide tube 33, a switch controller 34 and a fixed frame 35. The second material holder 31 is made of quartz or metal and holds a plurality of material bits 40. The buffering discharger 32 is arranged at the outlet 311 of the second material holder 31 to receive the material bits 40 output by the second material holder 31. The material discharging guide tube 33 is corresponding to a buffering discharge outlet 321 of the buffering discharger 32 and communicates with the feeding chamber 21. In details, the buffering discharger 32 has a carrying portion 322 to carry the material bits 40, a blocking portion 323 to prevent the material bits 40 from dropping out, the buffering discharge outlet 321, and a pivotal connection portion 324 coupled to the carrying portion 322. The buffering discharge outlet 321 is connected with the carrying portion 322 and the blocking portion 323. The carrying portion 322 is connected with the blocking portion 323 to form a housing space to hold the material bits 40 output from the outlet 311 of the second material holder 31. The fixed frame 35 is used to fix the positions of the second material holder 31, the buffering discharger 32 and the switch controller 34. The pivotal connection portion 324 is connected with the fixed frame 35 and enables the carrying portion 322 to rotate pivotally. The switch controller 34 has a swing arm 341 and a control cable 342 connected with the swing arm 341. The switch controller 34 is arranged above the second material holder 31 and connected with the fixed frame 35. The control cable 342 passes through the second material holder 31 and the outlet 311 to connect with the carrying portion 322. The swing arm 341 drives the control cable 342 to control the distance between the carrying portion 322 and the outlet 311.

Figure 2:
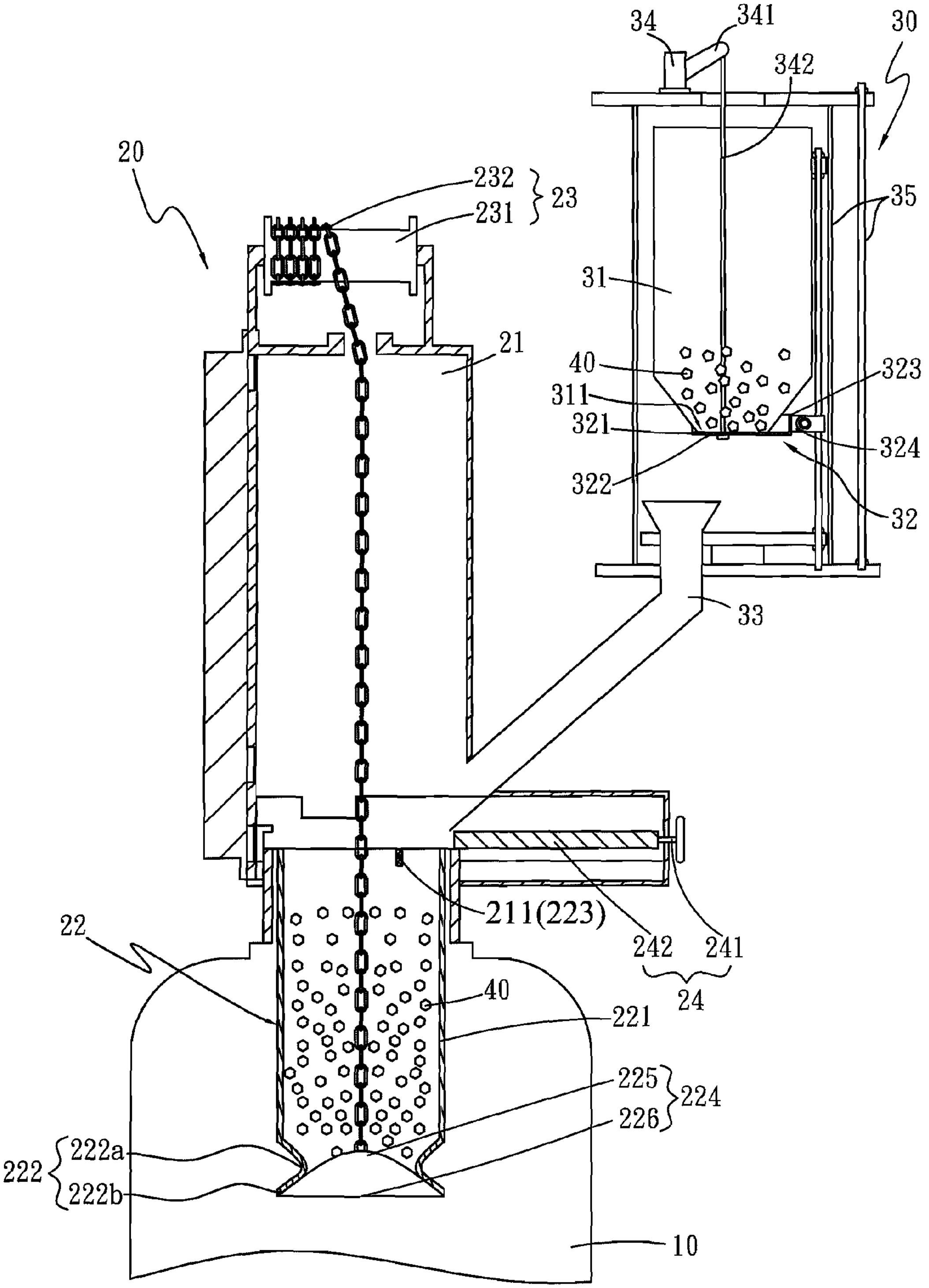
FIG. 2 is a diagram schematically showing Operation 1 of the primary feeder according to one embodiment of the present invention.
Figure 3:
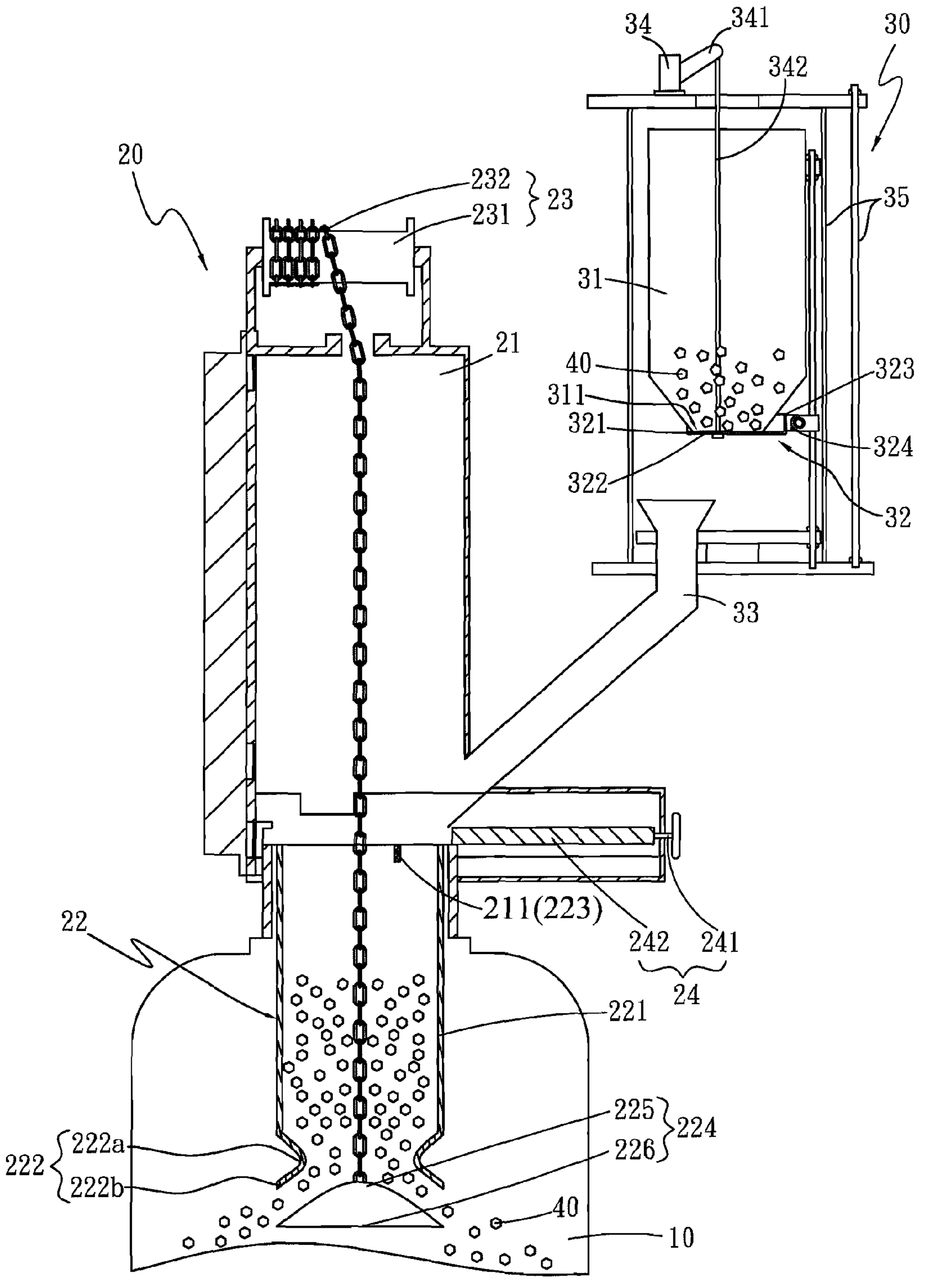
FIG. 3 is a diagram schematically showing Operation 2 of the primary feeder according to one embodiment of the present invention.

Refer to FIG. 2 and FIG. 3 for diagrams schematically showing Operation 1 and Operation 2 of the primary feeder 20 respectively according to one embodiment of the present invention. After the material bits 40 have been charged into the first material holder 22, the valve 242 of the isolation valve 24 is slid horizontally along the translational track 241 to open so as to interconnect the feeding chamber 21 and the growth furnace 10. The first material holder 22 descends from the feeding chamber 21 until the positioning slot 223 latches with the positioning block 211. At this time, the first material holder 22 is immobile, but the flexible cable 232 of the elevator mechanism 23 continues to descend. Refer to FIG. 3. As the flexible cable 232 continues to descend to drive the material stopper 224 to descend as well, the material stopper 224 is thus separated from the output opening 222. Then, the material bits 40 drop out from the output opening 222 to the growth furnace 10 for a melting process.

Figure 4:
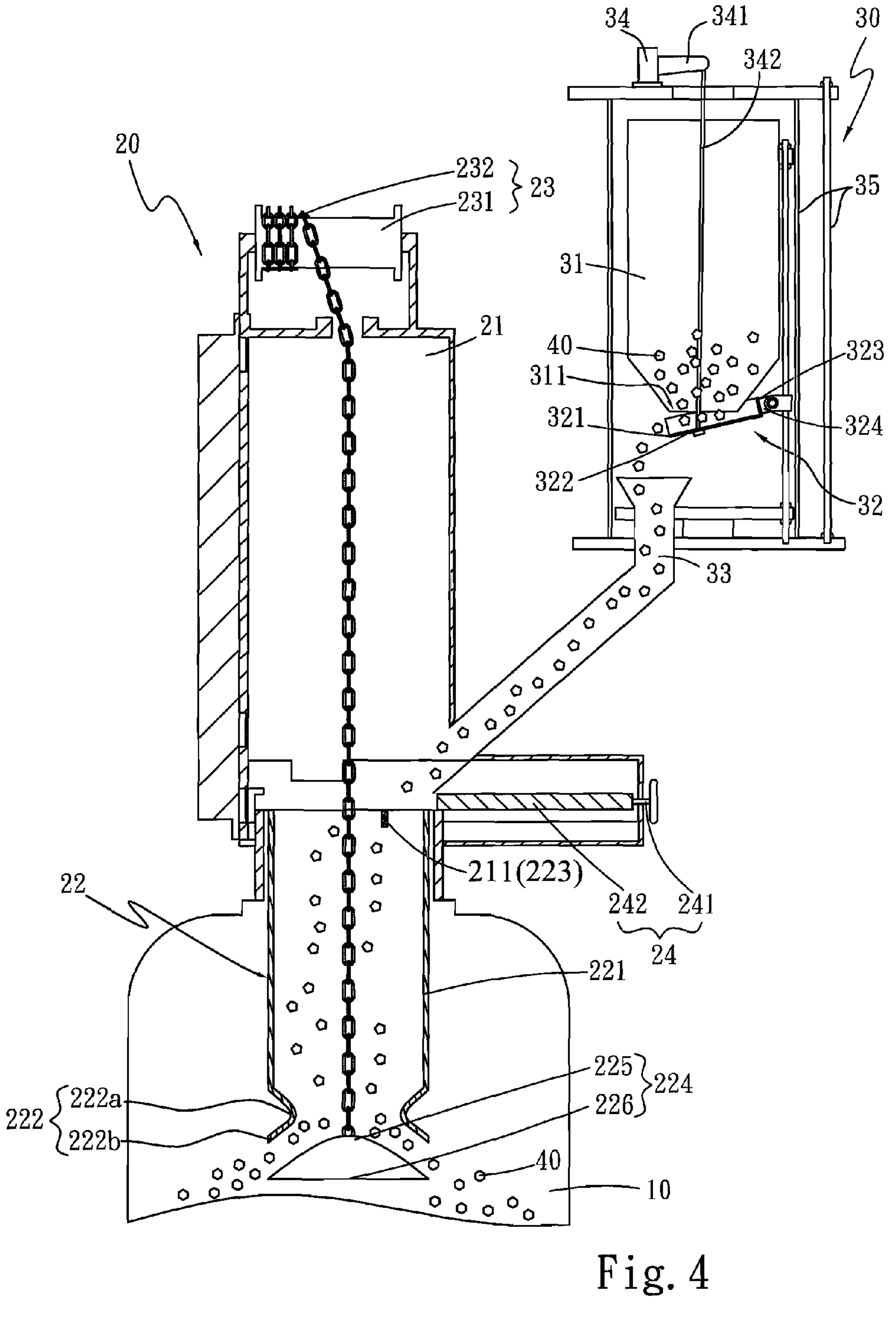
FIG. 4 is a diagram schematically showing an operation of the secondary feeder according to one embodiment of the present invention.

After the primary feeder 20 has finished material feeding, the material bits 40 originally held in the first material holder 22 are thus dropped completely in a crucible of the growth furnace 10. Refer to FIG. 4. Then, the secondary feeder 30 begins to discharge material. Firstly, the buffering discharger 32 receives the material bits 40 output by the second material holder 31. Next, the switch controller 34 controls the swing arm 341 to release the control cable 342, whereby the carrying portion 322 is tilted and separated from the outlet 311 of the second material holder 31. Thus, the material bits 40 drop out from the buffering discharge outlet 321 to enter the material discharging guide tube 33 and finally reach the crucible. Thereby, the secondary feeder 30 can resupply the material bits 40 after the primary feeder 20 has finished a single feeding process. Therefore, there is no need to pull up the primary feeder 20 through the elevator mechanism 23 to recharge material into the primary feeder 20. Thus is saved feeding time.

In addition to the above-mentioned material feeding process, the primary feeder 20 and the secondary feeder 30 may undertake material feeding separately. Below is described another material feeding process. Firstly, the primary feeder 20 undertakes a material feeding process. After the primary feeder 20 has finished the material feeding process, the elevator mechanism 23 pulls up the first material holder 22 with the isolation valve 24 not closed. Next, the secondary feeder 30 undertakes another material feeding process. At the same time, the material bits 40 are charged into the primary feeder 20. After the primary feeder 20 has been charged well, the secondary feeder 30 stops feeding material, and the elevator mechanism 23 lowers the first material holder 22 to undertake another material feeding process. In such a material feeding way, when the primary feeder 20 is recharged, the secondary feeder 30 succeeds to feed material, thereby is effectively increased the feeding speed. The primary feeder 20 not only can apply to feeding material bits 40 but also can apply to crystal pulling and crystal purification. The crystal used in the present invention can be sapphire, monocrystalline silicon or polycrystalline silicon.

In conclusion, the present invention uses the primary feeder 20 and the secondary feeder 30 to accelerate material feeding speed lest the overall feeding time is wasted by waiting for recharging material. The present invention can use the primary feeder 20 to undertake a single material feeding process and use the secondary feeder 30 to resupply material and adjust and control the feeding amount of the material bits 40. Further, the primary feeder 20 and the secondary feeder 30 may undertake material feeding separately to satisfy requirements of fabricating monocrystalline silicon and polycrystalline silicon. Furthermore, by means of the flexible cable-type elevator mechanism 23 of the primary feeder 20 and the translational isolation valve 24 in the invention can greatly decrease the total height of the system. Besides, the secondary feeder 30 has simple structure and can feed material in a buffering vibratory manner to prevent from material blocking.

Therefore, the present invention possesses utility, novelty and non-obviousness and meets the condition for a patent. Thus, the Inventors file the application for a patent. It is appreciated if the patent is approved fast.

The embodiments described above are only to exemplify the present invention but not to limit the scope of the present invention. Any equivalent modification or variation according to the spirit of the present invention is to be also included within the scope of the present invention.

What is claimed is:

1. A composite continuous feeder, which is arranged above a growth furnace, comprising:

a primary feeder which is coupled with the growth furnace and includes a feeding chamber, a first material holder and an elevator mechanism; wherein the feeding chamber communicates with the growth furnace; wherein the first material holder holds a plurality of material bits; and wherein the elevator mechanism is coupled to the feeding chamber and the first material holder and used to lift or lower the first material holder in the feeding chamber; and a secondary feeder which is coupled with the growth furnace and includes a second material holder, a buffering discharger and a material discharging guide tube; wherein the second material holder holds a plurality of material bits; wherein the buffering discharger is arranged at an outlet of the second material holder to receive the material bits output by the second material holder; and wherein the material discharging guide tube is corresponding to a buffering discharge opening of the buffering discharger and communicates with the feeding chamber, wherein the feeding chamber includes a positioning block; herein the first material holder includes a hollow casing to hold the material bits, an output opening for discharging the material bits, a positioning slot corresponding to the positioning block for latching, and a material stopper corresponding to the output opening; wherein the positioning slot is arranged on an outer surface of the casing and coupled thereto, and latches the positioning block to restrict movement of the first material holder; and wherein the material stopper functions as a switch of the output opening to control the output of the material bits.

2. The composite continuous feeder according to claim 1, wherein the elevator mechanism is a flexible cable-type elevator mechanism and includes a reel and a flexible cable wound on the reel, and wherein the reel is fixedly connected with the feeding chamber, and the flexible cable is coupled to the first material holder.

3. The composite continuous feeder according to claim 1, wherein the material stopper is arranged inside the first material holder and includes a connection end and a stopping end; wherein the flexible cable passes through the first material holder to connect with the connection end; and wherein the stopping end is formed in a shape matches that of the output opening to plug the output opening for closing.

4. The composite continuous feeder according to claim 3, wherein the material stopper is formed in an arc shape; and wherein the output opening includes a neck portion and an opening end corresponding to the material stopper.

5. The composite continuous feeder according to claim 1, wherein an isolation valve is arranged at a junction of the feeding chamber and the growth furnace; wherein the positioning block is arranged near the isolation valve; wherein the isolation valve includes a translational track and a valve corresponding to the translational track; and wherein moving direction of the translational track is perpendicular to that of the first material holder.

6. The composite continuous feeder according to claim 1, wherein the buffering discharger includes a carrying portion to carry the material bits, a blocking portion to prevent the material bits from dropping out and the buffering discharge outlet; and wherein the buffering discharge outlet is connected with the carrying portion and the blocking portion.

7. The composite continuous feeder according to claim 6, wherein the secondary feeder includes a switch controller connected with the carrying portion and a fixed frame to fix the second material holder, the buffering discharger and the switch controller; and wherein the switch controller controls distance between the carrying portion and the outlet to regulate material feeding.

8. The composite continuous feeder according to claim 7, wherein the buffering discharger further includes a pivotal connection portion fixed on the fixed frame and coupled to the carrying portion.

9. The composite continuous feeder according to claim 8, wherein the switch controller includes a swing arm and a control cable connected with the swing arm; wherein the control cable passes through the second material holder and the outlet to connect with the carrying portion; and wherein the swing arm drives the control cable to control distance between the carrying portion and the outlet.

10. The composite continuous feeder according to claim 6, wherein the carrying portion is connected with the blocking portion to form a housing space to hold the material bits output from the outlet of the second material holder.

* * * * *